July 6, 1937.　　　G. A. POWELL　　　2,086,475
ASPARAGUS COOKER
Filed Feb. 25, 1937
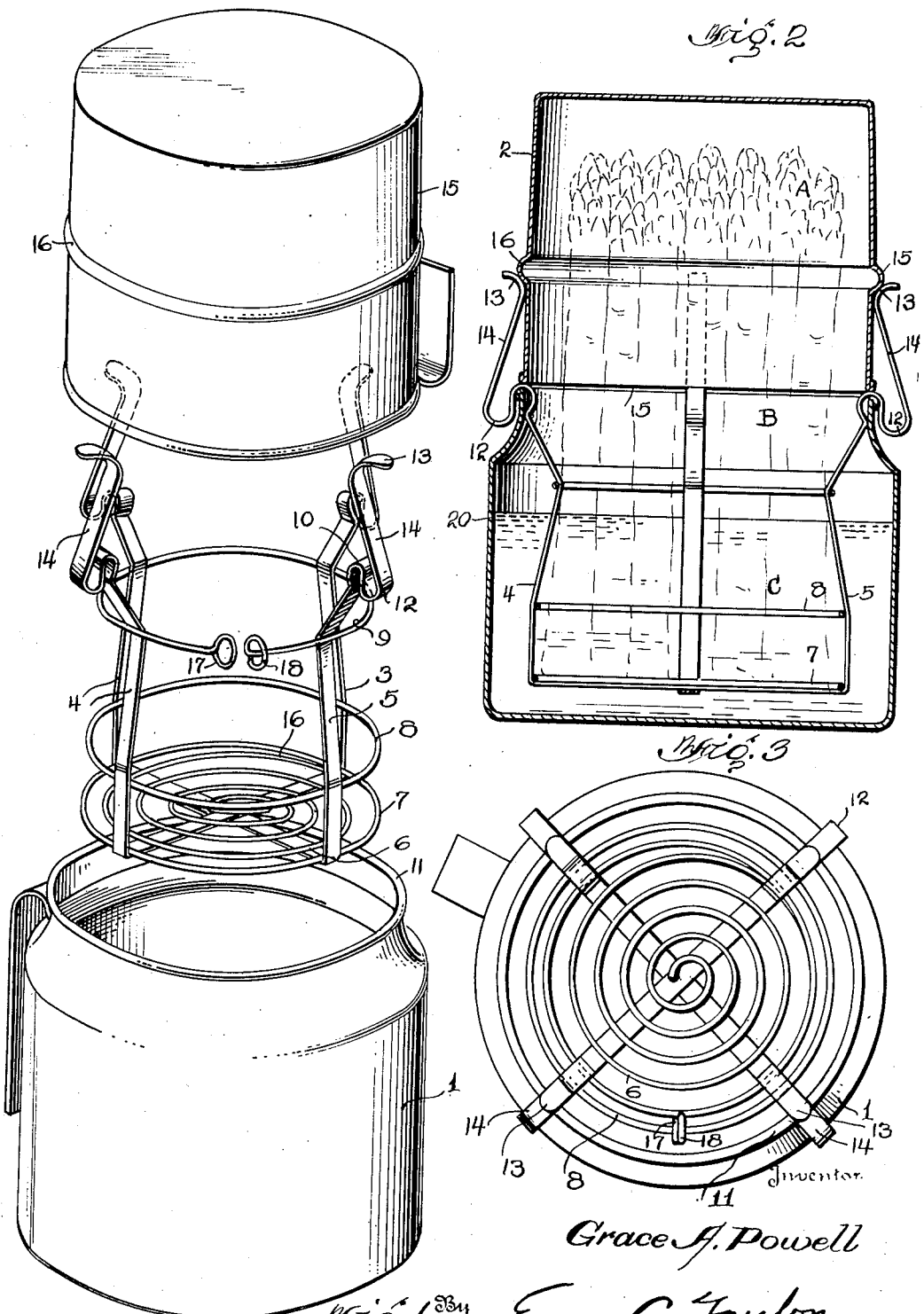

Patented July 6, 1937

2,086,475

UNITED STATES PATENT OFFICE 2,086,475

ASPARAGUS COOKER

Grace A. Powell, Hollywood, Calif.

Application February 25, 1937, Serial No. 127,743

REISSUED

5 Claims. (Cl. 53—2)

My invention relates to improvements in domestic, vegetable boiling and steaming utensils and more particularly to a device of this character for the combined support of a bunch of asparagus stalks and a pair of cooperating reversely arranged enclosing cooking receptacles, the latter being so correlated and arranged with respect to each other and to said device that the asparagus stalks will be effectively supported and positioned, through such organization of parts, with different longitudinal portions thereof in predetermined relationship to desired zones of treatment for such portions.

Due to the marked difference in the fibrous structure of an asparagus stalk, between its butt and tip ends, great difficulty has been experienced by the average cook, when attempting to effect uniform tenderness of the entire stalk, while preserving the natural flavor and appetizing appearance of all stalk portions.

Failure of apparatus heretofore devised to accomplish what is required in the thorough cooking of asparagus has resulted in the erroneous belief, by many, that much of the lower portion of the asparagus stalk is unsuitable for human consumption, and such portion has, therefore, been usually discarded either prior to the cooking operation or after such cooking as is required to render the upper tip portion edible.

From my experience in directing cooking operations for discriminating personages in many parts of the world, the satisfactory cooking of asparagus presents a most difficult and trying problem. The instant invention, therefore, has been scientifically developed as a result of my actual work in this field over a period of years and has been reduced to its present simple form, for commercial production and use with cooperating cooking receptacles of standard manufacture, such as are usually found in the average kitchen, to make available to the greatest number, a device capable of producing uniformly satisfactory results in the thorough cooking of asparagus stalks without producing limpidness and loss of flavor.

The primary object of the invention is, therefore, the production of a simple, inexpensive and efficient device for the combined support of a bunch of asparagus stalks and a pair of cooperating enclosing cooking receptacles, the said receptacles being so positioned and arranged with respect to each other and to said cooperating supporting device as to produce therebetween a plurality of zones of boiling and steaming treatment, through which organization provision is made for the escape of steam at a point substantially midway between the upper and lower limits of said zones of treatment.

Other objects of my invention relate to means whereby the tapering stalks of the asparagus may be expeditiously bunched within the device for the vertical support thereof and further to facilitate their removal from the device without breakage, it being recognized that asparagus stalks shrink slightly during such treatment.

These and other objects and advantages are accomplished by the invention hereindescribed and shown by the accompanying drawing wherein similar reference characters indicate similar parts and in which:

Figure 1 is what I will term an exploded view in perspective of the essential elements separated vertically to give a clear view of the same in their cooperative relationship to each other.

Figure 2 is an assembled view showing the two containers in central vertical section and the asparagus supporting device or rack in partial vertical section; and Figure 3 is a plan view of the lower container or receptacle with the rack or asparagus supporting device in operative position therein.

Referring to the drawing the invention is illustrated in Figures 1 and 2 in a combination comprising the usual double boiler with the parts reversed including a lower receptacle or boiler 1, an upper inverted receptacle 2 and a suspended supporting rack 3 for the asparagus to be cooked, which in use is first inserted within the vessel 1 through the open top edge thereof on which it is supported by means which will be described below.

Figure 2 shows the relation of parts when in operative assembled position, the two receptacles being shown in section and the supporting rack in position in the lower receptacle and in supporting relation with the inverted container 2 which is held in predetermined position by arm extensions of the rack.

The asparagus supporting member or rack 3, as illustrated, is made up in the following manner: The main supporting elements 4 and 5 consist of two strips of thin flat spring metal placed at right angles to each other and having their extremities bent to form a frame having four supporting arms. These strips are bent at right angles as indicated at 6 to form the upright portions of the frame and also to define the bottom portion of the supporting element or rack. The outline of the bottom of the rack is defined by the ring 7 above which is located a ring-like member 8 of substantially the same diameter. Above the ring 8 another ring-like member 9 of somewhat smaller diameter than the rings 7 and 8 is also rigidly secured to the frame members 4 and 5 for a purpose which will be later described. These rings 7, 8 and 9 are permanently attached to the supporting strips 4 and 5 by soldering, welding, or by any other suitable method of attachment which will withstand a temperature such as that to which the device is ordinarily subjected in cooking.

It will be noted that the rings 7 and 8 are attached to the upright supporting strips on the inside of these strips 4 and 5 while the ring 9 is attached to the outside of the strips. By this construction it will be readily apparent that the supporting strips 4 and 5 clamp the lower rings and will tend to hold them in proper position even though one of the points of attachment of the rings to the strips should become loose. On the other hand, by reason of the fact that the ring 9 is attached to the outside of the supporting strips, it will be apparent that this ring will be held in position by the strips and the strips by the ring even after they are repeatedly sprung outwardly to engage the sides of the dome-like receptacle 2 upon the boiler 1. The rings 7 and 8 are preferably of the same diameter and of sufficient size to accommodate a bunch of asparagus stalks of average dimensions, while the ring 9 is made somewhat smaller in diameter in order to take into consideration the smaller size of the stalks of asparagus at a position intermediate their ends. The object of this arrangement is to keep the stalks of asparagus in closely adjacent upright position during the cooking operation and prevent any tendency of their falling over due to softening during the cooking process.

The upper ends of the supporting strips 4 and 5 above the ring 9 are first bent outwardly and downwardly, as indicated at 10, to form hook-like portions to engage the upper rim 11 of the lower or boiler receptacle 1 and thus support the rack in proper position therein. Beyond the bend at 10 the end portions of the strips referred to, are bent upwardly as at 12 and are extended upwardly and inwardly a considerable distance above the bend 10 and are then bent outwardly as at 13. These upwardly extending portions 14, of the supporting straps, are for the purpose of providing resilient arm portions for engagement with the outside wall surface of the inverted receptacle 2, as shown in Figure 2, to hold it in proper supported position with respect to the boiler 1 and the asparagus supporting member or rack 3. The straps 4 and 5 and their supporting end portions are capable of being deflected to accommodate the rack to boilers differing slightly in diameter at the top, but nevertheless provide sufficient resiliency to clamp an upper receptacle and hold it in proper position with respect to the boiler and rack. In this connection attention is also called to the fact that the boiler 1 and inserted dome-like receptacle 2, when in proper position, are spaced apart by the thickness of the straps 4 and 5 as indicated at the point 10 where these straps are bent over the upper edge 11 of the boiler 1, thus providing a circumferential space 15 between the two receptacles for the escape of steam. This is important in the successful operation of the device in maintaining proper operating temperatures and conditions for the purpose intended throughout the height of the cooking space formed by the superposed receptacles. As the space or zone indicated at A (Fig. 2) is furthermost from the source of heat and capable of rapid radiation through the upper wall surfaces of the receptacle 2 a milder cooking range is maintained in this zone than at the level indicated at B above which steam is allowed to escape through the surrounding space 15. A boiling temperature is maintained within the zone C.

As indicated above, the invention is illustrated in connection with the separable portions of the usual type of double boiler in which the inner receptacle when removed may be inverted to form a dome-like receptacle and mild cooking space above the boiler receptacle for the tip portions of the asparagus stalks in which light steam pressure is maintained. The inner boiler of the type referred to is usually provided with a bead on its outside such as at 16 to support the same when it is inserted in the lower boiler and the arrangement shown in Figure 2 illustrates the cooperation of this bead and the outwardly turned end portion 13 of the arms 14 as a partial support for the inverted receptacle 2. It will thus be seen that the resilient metal straps 4 and 5 and their bend portions 10 form a positioning means for the asparagus supporting and confining rack which is provided by the bottom 17 and side forming rings 7, 8 and 9 for holding the asparagus stalks upright, and by means of the further bent extensions 12, 13 and 14, maintain the inverted receptacle in proper cooking relation with respect to the lower boiler and said intermediate rack.

The bottom 17 of the rack may be formed in various ways as by an open wire screen although it has been found most practical to construct the device as shown in the drawing which consist of a spiral made of a single wire beginning adjacent the center and terminating in the lower ring 7 as illustrated in Fig. 3. This spiral constituting the bottom 17 of the rack is attached to the horizontal flat portions of the strips 4 and 5 by welding or in any other suitable manner.

In order to facilitate the placing of the asparagus stalks in the rack 3 and their removal therefrom, the upper ring 9 may be broken at one point and the free ends turned to provide readily engageable hook-portions 18 and 19, shown open in Fig. 1. With such an arrangement the asparagus stalks may be bunched into the rack until it is substantially full and the ends 18 and 19 of the ring 9 brought into interlocking relation as indicated in Figure 3, whereupon the filled rack may be placed in the boiler 1 and the cooking proceeded with as herein explained.

The ring 9 may be made continuous as rings 6, 7 and 8, in which case the rack may be substantially filled from the top and the last stalk or two may be slipped into the ring 9 from below and then pushed inwardly and downwardly behind ring 8 thus to completely fill the rack.

What I claim is—

1. An asparagus cooker comprising upper and lower dome-shaped receptacles of substantially uniform dimensions arranged in superimposed relationship, an asparagus stalk supporting device having resilient arms supportingly embracing the opposed open end portions of said receptacles and providing a circumferential steam exit substantially midway between the top and bottom respectively of said superimposed receptacles, said arms having resilient end extensions embracing the outer wall of at least one receptacle for positioning said receptacles with respect to each other and to the asparagus supporting device suspended between said receptacles, said supporting device extending a substantial distance into the lower receptacle whereby the asparagus stalks are supported in vertical position with substantially one-half the length of said stalks in each of said receptacles.

2. In an asparagus cooking utensil comprising upper and lower dome-shaped receptacles, an asparagus supporting device comprising a wire frame having a bottom and a plurality of resilient strap-like portions having means embracing the inner and outer wall portions of said receptacles providing a support for said frame, and a positioning, connecting, and spacing means for said receptacles.

3. In an asparagus cooking utensil, a supporting rack comprising a plurality of supporting arms for a bottom portion, encircling means spaced from the bottom of the rack for retaining the butt end portions of the asparagus stalks and rigidly connected to said arms, and a second encircling means spaced from said first mentioned means and rigidly attached to said arms for engagement with the intermediate portions of the asparagus stalks to maintain them in upright position, said last mentioned means being of smaller diameter than the first mentioned means.

4. In an asparagus cooking utensil, a stalk supporting frame having a circular bottom and vertically and annularly arranged members rigidly connected together, said vertically extending members being in the form of resilient straps, and one of said annular members being connected circumferentially about said straps above said bottom and having interlocking disconnectible end portions for enlarging or reducing the diameter of said portion of the frame.

5. An asparagus supporting rack for suspension in a boiler receptacle and clamping an inverted dome-like receptacle thereon, comprising a pair of light spring metal straps crossed at right angles to support an openwork bottom position, and bent upwardly at right angles to provide a supporting frame structure, a ring located within and attached to the straps at the right-angled bends to define the outline of the bottom of the rack, a second ring spaced from the bottom ring and attached to the inside of the straps to retain the butt ends of the asparagus stalks, a third ring surrounding and attached to the straps and spaced from the second ring substantially twice the distance between the first and second rings, said third ring being of less diameter than said other rings, the end portions of said straps beyond the third ring being bent outwardly and downwardly to form hook portions to support the rack in a boiler, said end portions being further bent inwardly and upwardly to form spring fingers for clamping an inverted dome-like receptacle in position over said boiler.

GRACE A. POWELL.